United States Patent
Natarajan

(10) Patent No.: US 7,740,806 B2
(45) Date of Patent: Jun. 22, 2010

(54) CERAMIC MICROARRAY SPOTTING DEVICE FOR BIOASSAY PRINTING

(75) Inventor: Govindarajan Natarajan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/307,931

(22) Filed: Feb. 28, 2006

(65) Prior Publication Data

US 2007/0199642 A1 Aug. 30, 2007

(51) Int. Cl.
*B41J 2/005* (2006.01)
(52) U.S. Cl. .................................. 422/100; 436/180
(58) Field of Classification Search .............. 422/100; 436/180; 347/20, 21, 40, 83, 92, 95, 44, 347/45, 47
See application file for complete search history.

(56) References Cited

U.S. PATENT DOCUMENTS

| | | | |
|---|---|---|---|
| 6,416,294 B1* | 7/2002 | Zengerle et al. ............... 417/53 |
| 6,442,041 B2 | 8/2002 | Rehm et al. | |
| 6,858,185 B1* | 2/2005 | Kopf-Sill et al. ............ 422/100 |
| 7,479,256 B1* | 1/2009 | Gruhler et al. .............. 422/100 |
| 2004/0129371 A1 | 7/2004 | Natarajan et al. | |
| 2004/0262223 A1* | 12/2004 | Strook et al. ................ 210/634 |
| 2005/0003554 A1* | 1/2005 | Brasseur ...................... 436/172 |
| 2005/0069462 A1 | 3/2005 | Humenik et al. | |
| 2005/0069949 A1 | 3/2005 | Humenik et al. | |
| 2005/0077657 A1 | 4/2005 | Ahmad et al. | |
| 2006/0022130 A1* | 2/2006 | Bousse et al. ............... 250/288 |
| 2006/0060769 A1* | 3/2006 | Bousse et al. ............... 250/282 |

FOREIGN PATENT DOCUMENTS

| | | | |
|---|---|---|---|
| WO | WO0117669 A1 * | 3/2001 |
| WO | WO 01/41931 A2 | 6/2001 |
| WO | WO 2004/063103 A1 | 7/2004 |
| WO | WO 2005/032448 | 9/2004 |

* cited by examiner

*Primary Examiner*—Jill Warden
*Assistant Examiner*—Shogo Sasaki
(74) *Attorney, Agent, or Firm*—DeLio & Peterson, LLC; Kelly M. Nowak; Joseph Petrokaitis

(57) ABSTRACT

Methods of making and the resultant micro-spotting plates having a plurality of feed holes, a plurality of dispensing nozzles, an open cavity in communication with the dispensing nozzles and a plurality of channels. The channels connect the feed holes to the dispensing nozzles for transferring a fluid from the feed holes to the dispensing nozzles under a capillary force. A channel may connect a single feed hole retaining a liquid to a dispensing nozzle for dispensing such liquid, or a channel may connect two or more feed holes to a dispensing nozzle for enabling mixing of fluids from the feed holes within the channel prior to dispensing such mixture. The micro-spotting plates allow the continuous self-feeding flow of fluids by capillary forces through its hydrophilic layers for enabling the controlled dispensing of a multi-array of drops of fluids onto a substrate, preferably a test slide, for later use.

6 Claims, 4 Drawing Sheets

CERAMIC MICROARRAY SPOTTING DEVICE FOR BIOASSAY PRINTING

BACKGROUND OF THE INVENTION

1. Field of the Invention

The present invention is directed to testing reagents, and in particular, to devices and methods for simultaneously dispensing a plurality of microarray droplets of reagents onto a slide for use in testing biological and/or chemical interactions.

2. Description of Related Art

In the pharmaceutical and medical industries, it is often necessary to run numerous tests on a variety of different reagents. These tests include the analysis of chemical samples, biological samples, drug interactions, drug activity, testing for diseases and sickness, diagnostic tests, and the like. A number of such tests require the analysis of multiple samples in a single run. As the demand continues to increase for both existing tests, and for new tests and drug discoveries, the requirement for multiple sampling through-put remains high. This is particularly true for testing the endless possibilities of combinations of reagents, such as reagents $A_1$-$Z_n$, where n can be on the order of millions, for use in the research and development of new drug discoveries and testing procedures.

It is well known to use plastic well plates for supplying the various chemicals and biological samples for contact and interaction of these substances within the wells. For example, commercially available plastic card arrays include 96 and 384 wells, having diameters typically of about 3 mm to about 4 mm, and depths of about ½ inch. However, it has been found that plastic well plates undesirably use large quantities of expensive chemicals and/or reagents, and obtain very few data points simultaneously. Further, since plastic well plates are formed by extrusion, the precision of the hole diameter and location within the array is not adequate enough to fabricate micro holes and micro channels required for newer technologies. In the event well opening diameters and locations are not to exact specifications, the precision of both analytical instrumentation used in introducing the chemicals and reagents into the well openings, as well as instrumentation for scanning the well openings, will be imprecise. Thus, the extension of plastic well plates into this field is limited.

With the currently available technology, a large number of samples can now be scanned in a single run due to the speed of computer assisted scanning devices. For instance, microfluidic scanning devices allow for the integration and miniaturize of multiple laboratory processes into a single conventional chip size device by increasing the number of well openings in a given volume within the well plate. Thus, the need remains high for an increased number of smaller micro holes and channels within a given volume in the well plate. The implementation of a larger number of smaller micro holes and channels reduces the consumption of expensive chemicals and/or reagents used during the analysis or testing, which in turn, lowers manufacturing costs, increases sample throughput, provides faster end results due to the faster analysis, provides high performance and success, and allows for an enormous scope of integration and ease of automation with the various available instrumentation. Such a micro device would be particularly beneficial for dispensing numerous, small amounts of reagent onto a glass test slide (i.e., "microspotting"), which is then dried for later diagnostic and/or experimental use.

Accordingly, a need continues to exist for micro devices that have multiple thousands of wells with diameters of the order of 100 microns and channels connecting the selective wells at different levels within the array for dispensing small amounts of reagents, particularly onto a test slide.

SUMMARY OF THE INVENTION

Bearing in mind the problems and deficiencies of the prior art, it is therefore an object of the present invention to provide a micro device with micro wells and micro channels and a method for formation thereof.

It is another object of the invention to provide an array of micro wells and micro channels in a micro device that are personalized to desired specifications.

Another object of the invention is to provide an array of micro wells and micro channels in a ceramic micro device by laminating and/or sintering multiple personalized green sheets together.

Yet another object of the invention is to provide a micro device, and method of making such micro device, that has multiple thousands of wells and channels connecting selective wells at different levels within the device for dispensing reagent across a substrate surface.

Another object of the invention is to provide a micro device, and method of making such micro device, for microspotting slides with a plurality of drops of reagent per unit area.

It is another object of the invention to provide a micro device, and method of making such micro device, that reduces costs, minimizes the amount of reagent dispensed, increases the number of samples/reagents that can be tested in a single processing run, and is easy and efficient to use when microspotting slides for diagnostic use.

Still other objects and advantages of the invention will in part be obvious and will in part be apparent from the specification.

The above and other objects, which will be apparent to those skilled in art, are achieved in the present invention, which is directed to in a first aspect a ceramic plate for dispensing fluids. The ceramic plate includes a ceramic body having a plurality of reservoir feed holes, a plurality of dispensing nozzles, an open cavity in direct communication with the plurality of dispensing nozzles and a plurality of channels. The channels connect the reservoir feed holes to the dispensing nozzles for transferring a fluid from the reservoir feed holes to the dispensing nozzles under a force, upon pressure being provided from the open cavity into the plurality of dispensing nozzles, for dispensing the fluid from the ceramic body.

The ceramic body preferably comprises a hydrophilic material that may be fabricated with a variety of openings residing within the body horizontally, vertically or even combinations thereof, for meeting desired specifications. Also, the ceramic body may be fabricated to any desired shape including, but not limited to, circular, square and rectangular. In the ceramic plate, each channel may be connected to a single reservoir feed hole, or alternatively, to two or more reservoir feed holes for intermixing two or more fluids in transit prior to dispensing such mixture. Similarly, each channel may be connected to a single dispensing nozzle, or alternatively, to two or more dispensing nozzles for dispensing a fluid in drops onto a substrate. These channels may reside within the ceramic body horizontally, vertically and combinations thereof. The open cavity is adapted to receive an actuating means for providing pressure into the plurality of dispensing nozzles.

In another aspect, the invention is directed to a method of dispensing fluids from a ceramic plate. The method includes providing a ceramic body having a number of openings. These openings include a plurality of reservoir feed holes, an open cavity in direct communication with a plurality of dispensing nozzles, and a plurality of channels connecting the plurality of reservoir feed holes to the plurality of dispensing nozzles. At least one fluid is provided into the plurality of reservoir feed holes. A pressure is then forced from the open cavity into the plurality of dispensing nozzles for generating a force within the openings, preferably a capillary force. In so doing, the capillary force causes the fluid to be transferred from the plurality of reservoir feed holes through the channels and into the dispensing nozzles for dispensing drops of fluid from the nozzles onto a substrate.

In this aspect, the ceramic body is also preferably a hydrophilic material, and providing an actuating means within the open cavity generates the pressure. Each channel may be connected to a single feed hole for transferring the liquid in such feed hole to the dispensing nozzle for dispensing onto a substrate. Alternatively, a channel may be connected to two or more reservoir feed holes for enabling the intimate mixing of the liquids received from such feed holes in the channel, whereby such mixture is transferred to a dispensing nozzle, or more than one the dispensing nozzle, for dispensing drops of the mixture onto a substrate.

In still another aspect, the invention is directed to forming a ceramic plate for dispensing fluids. The method includes providing a plurality of greensheets and forming first, second, third and fourth sets of openings respectively in first, second, third and fourth sets greensheets of such plurality of greensheets. The greensheets having these openings therein are stacked in alignment to one another such that the first set of openings form a plurality of reservoir feed holes, the second set of openings form a plurality of dispensing nozzles, the third set of openings form an open cavity in direct communication with the plurality of dispensing nozzles, and the fourth set of openings form a plurality of channels connecting the reservoir feed holes to the dispensing nozzles. These stacked, aligned greensheets are then laminated to another for forming the sintered ceramic plate of the invention for dispensing fluids. The sintering process fuses all the layers together such that a separate bonding process is not required.

In this aspect of the invention, the first, second, third and fourth sets of openings are preferably formed by a material removal technique, more preferably, by punching openings in the greensheets using a punch tool. The punch tool preferably has a punch head with alternating punches of at least two different size diameters for forming the ceramic plate of the invention. In forming the present ceramic plate for micro-spotting, the first, second, third and fourth sets of openings formed in the greensheets may reside vertically or horizontally within a single greensheet, or they may reside vertically, horizontally or combinations thereof in different greensheets.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
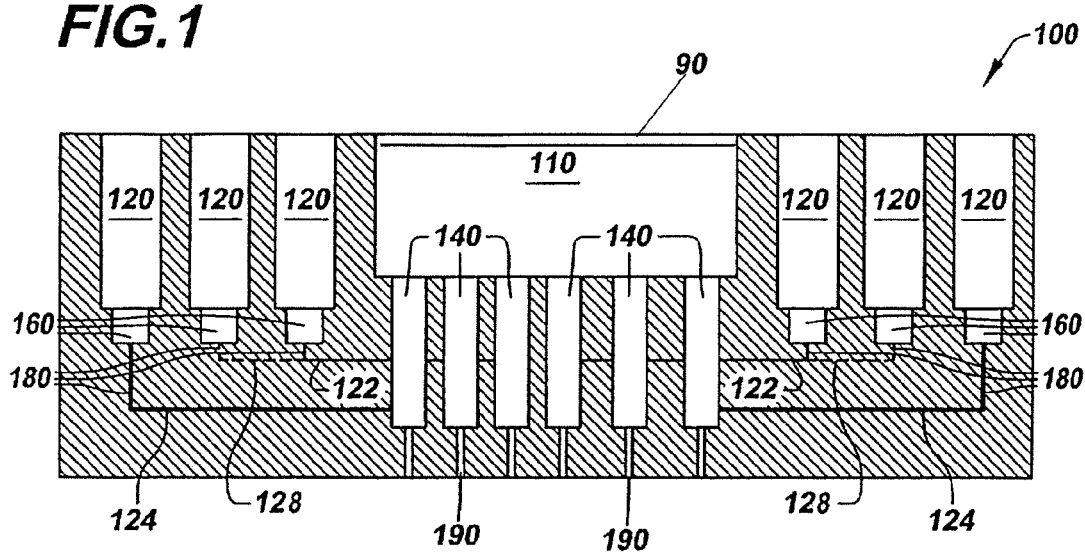
FIG. 1 shows a cross sectional view of a micro-spotting device of the invention.

In describing the preferred embodiment of the present invention, reference will be made herein to FIGS. 1-7 of the drawings in which like numerals refer to like features of the invention.

The present invention is directed to micro-spotting devices and methods of making such micro-spotting devices. Each micro-spotting device of the invention is preferably a co-sintered, multifunctional microarray spotting device having a single large cavity for actuating a fluid surface, a number of reservoir feed holes for receiving and retaining at least one fluid (i.e., reagent) or a number of different fluids within different reservoirs, a number of different fluid channels for receiving the fluids from the reservoir feed holes, and a number of different micro-spotting fluid dispensing nozzles connected to the channels for dispensing a multi-array of small amounts of fluid onto a substrate, preferably a glass test slide, for later use. The fluids provided within the present micro-spotting device may include, but are not limited to, fluids containing biological and/or chemical reagents for testing the numerous combinations thereof for both experimental and diagnostic uses.

In one aspect, each fluid channel may be connected to a single reservoir feed hole, such that, the fluid within the feed hole is introduced into and travels through the fluid channel, and then is introduced into a micro-spotting nozzle for dispensing the fluid onto the test slide. Alternatively, two or more reservoir feed holes may be connected to a single channel, such that, the fluids from the two reservoirs are introduced into the single channel, mixed therein in transit under a creep flow, preferably a creep flow of about Re<1, and then introduced into a single micro-spotting nozzle for dispensing the mixture onto a test slide.

The present micro-spotting device is preferably made of a hydrophilic material (e.g., alumino magnesium silicate glass) for enabling the continuous self feeding flow of fluids by capillary forces through its hydrophilic layers, and for enabling the controlled dispensing of fluids from the micro-spotting nozzles. Alternatively, the micro-spotting device may be made of any material, whereby once the openings for the reservoir feed holes, dispensing nozzles, and channels are formed, these openings are provided with a hydrophilic surface, such as, for example, coating the surfaces of such openings with a hydrophilic material.

Since each reservoir feed hole is of a sufficient size for retaining a sufficient amount of fluid, the present micro-spotting device is advantageously capable of dispensing numerous drops of fluid per reservoir in a controlled manner. The single large cavity of the micro-spotting device is adapted for receiving an actuating means 90 (e.g., a plunger) for actuating the fluid surface residing within the numerous micro-spotting nozzles. By actuating the fluid surface within the numerous micro-spotting nozzles, the micro-spotting device is able to dispense a small amount of the fluid from each micro-spotting nozzle onto the slide without contacting the slide. Dispensing of the drops of fluid onto the test slide from the micro-spotting nozzles may be performed continuously or in a discrete mode at predetermined intervals or times.

For ease of understanding the invention, and not to limit the invention in any manner, FIGS. 1-4 show one embodiment of a micro-spotting device 100 of the invention. This micro-spotting device includes a plurality of micro wells and micro channels connected to one another and residing throughout the device that form the single large cavity, reservoir feed holes, fluid channels, and micro-spotting nozzles for dispensing small amounts of fluids onto a substrate, preferably a glass test slide for diagnostic and/or experimental use. It should be appreciated and understood that the present micro-spotting devices may be personalized to desired specifications by being fabricated with varying matrices of micro wells and channels residing throughout the device.

Figure 2:
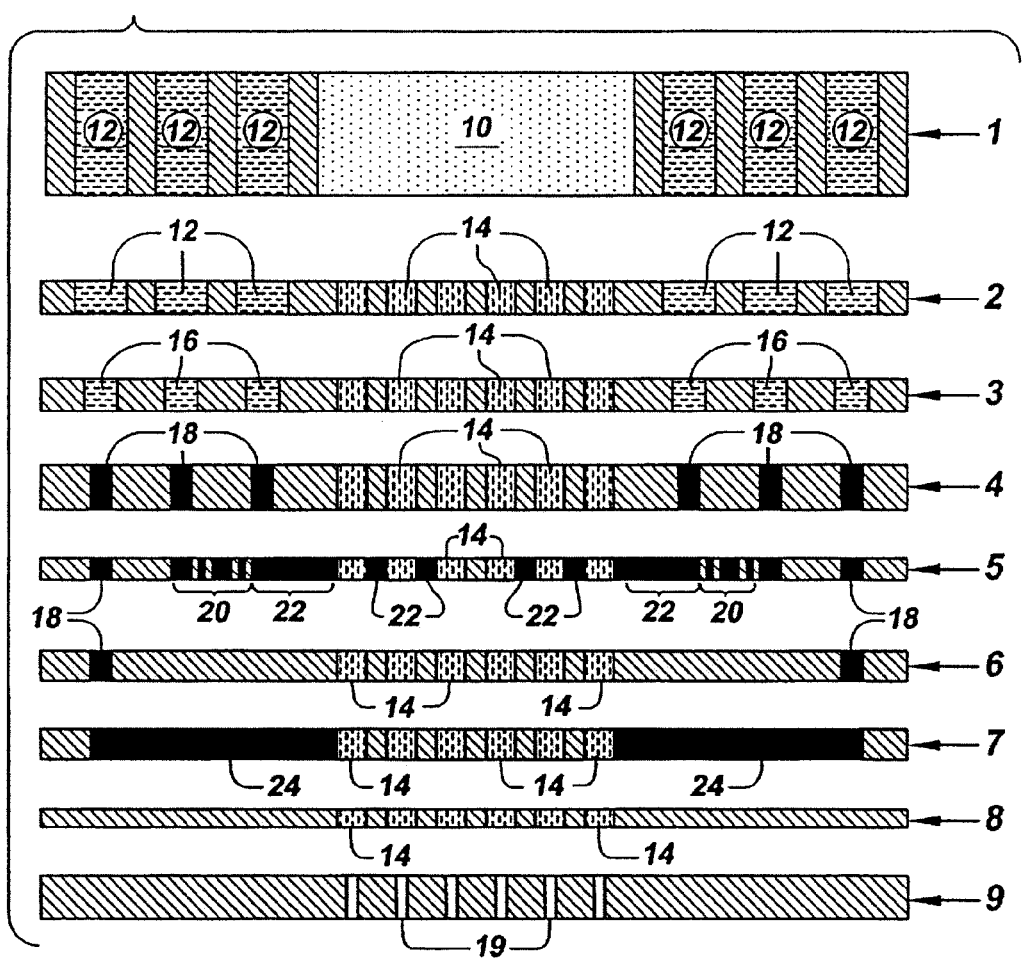
FIG. 2 shows cross sectional views of the various layering and processing steps for forming the micro-spotting device structure of FIG. 1.

The micro-spotting device 100 is preferably made from a plurality of greensheets. For example, FIG. 2 shows greensheet layers 1 through 9, whereby each greensheet layer is customized to meet the specifications for the desired resultant sintered micro device structure. The greensheets are preferably composed of a hydrophilic ceramic material including, but not limited to, alumino magnesium silicate glass, and the like. The thickness of each greensheet may vary depending upon the desired specifications of the micro device, but preferably range from about 3 mils to about 30 mils. The total thickness of the micro device structure may be any desired amount, but preferably is under 1 mm for integration into current macro field laboratory instrumentation.

A number of vertical and horizontal openings are formed in each greensheet for forming the micro wells and channels of the micro-spotting device. These vertical and horizontal openings are preferably formed in the greensheet by material removal techniques such as punching the material out of the greensheet by overlap punching (i.e., nibbling), laser drilling, e-beam drilling, sandblasting and high pressure liquid jets. Optionally, when punching the greensheets, a rigid support film may be provided at the underside of the greensheet to prevent any distortion to the greensheet and to the punched openings (e.g., embossing, via breakout, etc.) The rigid support film may be composed of any material that has sufficient rigidity (e.g., a metal film), which when provided at the underside of the greensheet, provides such greensheet with added strength during the punching process to protect both the greensheet and the resultant punched openings from detrimental damage.

Figure 7:
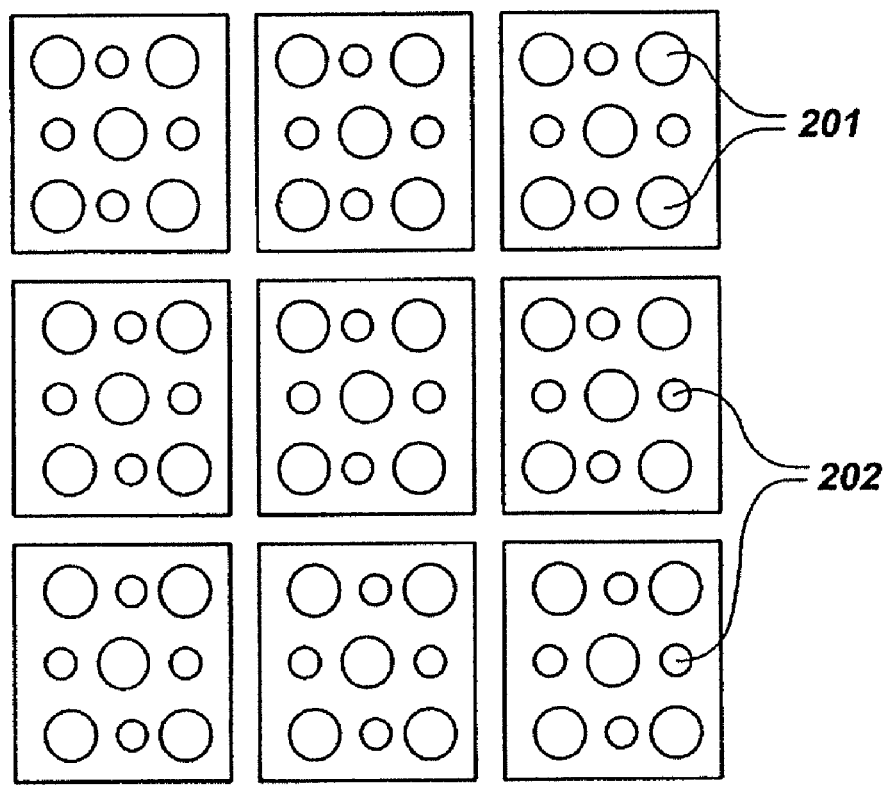
FIG. 7 shows a top plan view of a punch tool used to make the micro-spotting devices of the invention.

Referring to FIG. 7, wherein the vertical and horizontal openings are punched through the greensheets, a punch tool 200 may be integrated with at least two different punch sizes within a die set for forming the present micro-spotting device, e.g., a first punch 201 that has a larger diameter than a second punch 202, whereby every punch is a different size from its neighboring adjacent punches. This advantageously increases the through put of fabricating the present micro-spotting devices.

The different punch sizes are used to form both the vertical and horizontal openings within each greensheet, whereby a single greensheet may be provided with different size openings using such punching tool 200 in an efficient and timely manner. For instance, FIG. 2 shows greensheet layer 2 having a first punch size openings 12 in combination with second, smaller punch size openings 14. These punched openings 12, 14 may be formed using a single punch tool equipped with at least two different punch sizes and overlap punch processes. In so doing, the punch tool having different punch sizes is preferably programmed with a desired punch array pattern and sequence using the different alternate sized punches for punching the different sized openings within each greensheet. In forming the horizontal openings, the program may further include overlap punching the different punch sizes to form horizontal channel openings of different widths (and lengths) within each greensheet. Alternatively, the different sized openings within the greensheets may be provided using a single punch size using an overlap punch technique.

In accordance with the invention, whether a single punch is used, or multiple punches of different sizes are used, the horizontal openings are generally rectangular openings within the greensheets that may be smooth or rough, while the vertical openings within the greensheets may be circular, rectangular, smooth, rough or even combinations thereof. The diameter of each vertical opening may be about 20 microns or more, while the horizontal openings may have widths of about 20 microns, or more, and lengths greater than about 20 microns. However, it should be appreciated that the diameters used in fabrication ultimately depend upon the particular application and technical variables, such as, viscosity of the fluids that are to be provided within the micro-spotting device, the surface tension and/or activity of such fluids, the desired amounts of fluids, as well as the desired flow rates, capillary action and/or forced flow of the fluids, and the like.

Referring again to the device of FIGS. 1 and 2, the micro-spotting device 100 is fabricated by providing a plurality of greensheets, namely, greensheets 1-9, with numerous vertical and horizontal openings of different shapes and sizes. For instance, these openings include greensheets having a substantially central opening 10, and others or the same greensheets having a plurality of feed holes, which may include both large feed holes 12 and small feed holes 16 that reside either around or on adjacent sides of the central opening 10. Other greensheets are provided with a plurality of spotting hole openings, which may include both large spotting holes 14 and small spotting holes 19, in locations corresponding to under the central opening, as well as greensheets being provided with horizontal and/or vertical openings for forming the channels 20, 22, 24 and the connections 18 thereto.

Once the greensheets are provided with the plurality of desired vertical and horizontal openings of varying sizes and shapes, the greensheets are stacked, laminated and sintered together to form the resultant sintered micro-spotting device 100. The plurality of greensheets may be laminated in a conventional process involving heat, pressure and time to form the ceramic micro device structure 100. The preferred lamination pressure is under 800 psi, the temperature is under 90° C., and the lamination time is less than about 5 minutes. More preferably, the lamination pressure ranges from about 300 psi to about 2,000 psi, the temperature ranges from about 60° C. to about 90° C., and the lamination time ranges from about 1 minute to about 5 minutes. Upon completion of laminating the stack of greensheets, the laminated greensheets are then sintered in a conventional process to form the micro-spotting devices of the invention. It should be appreciated and understood that the sintering process and conditions are dependent upon the material of choice as well as the binder system used to form the greensheets.

Referring to FIGS. 1 and 2, the greensheets are stacked and aligned to one another such that the central opening(s) 10, large feed holes 12, small feed holes 16, large spotting holes 14, small spotting holes 19, and channels 20, 22, 24 with their connections 18 in corresponding greensheets are stacked in alignment, and then the stack is laminated and sintered to form the micro-spotting device 100. In so doing, the aligned central opening(s) form the single large cavity 110, preferably located substantially at a center of the device. The large feed holes 12 in combination with the small feed holes 16 form the reservoir feed holes having large 120 and small 160 portions for receiving and retaining a fluid(s). The large 14 and small 19 spotting holes form the micro-spotting nozzles 140, 190 of the micro-spotting device 100, while the channels 20, 22, 24 with their connections 18 form the fluid channels 128, 122, 124 with connections 180 for carrying the fluid from the reservoir feed holes 120, 160 to the micro-spotting nozzles 140, 190 of the device 100.

In the micro-spotting device 100 of the invention, the micro-spotting nozzles 140, 190 are in communication with both the single large cavity 110 and the fluid channels 128, 122, 124. A fluid, or a plurality of different fluids, are introduced into the large portion 120 of the reservoir feed holes and retained within both sections of the reservoir feed holes 120, 160. The smaller, or lower, portion 160 of the reservoir feed holes are in communication with the connection portion 180 of the fluid channels, which in turn are connected to the fluid channels 128, 122, 124, of device 100 for receiving fluid(s) from at least one reservoir feed hole.

Figure 3:
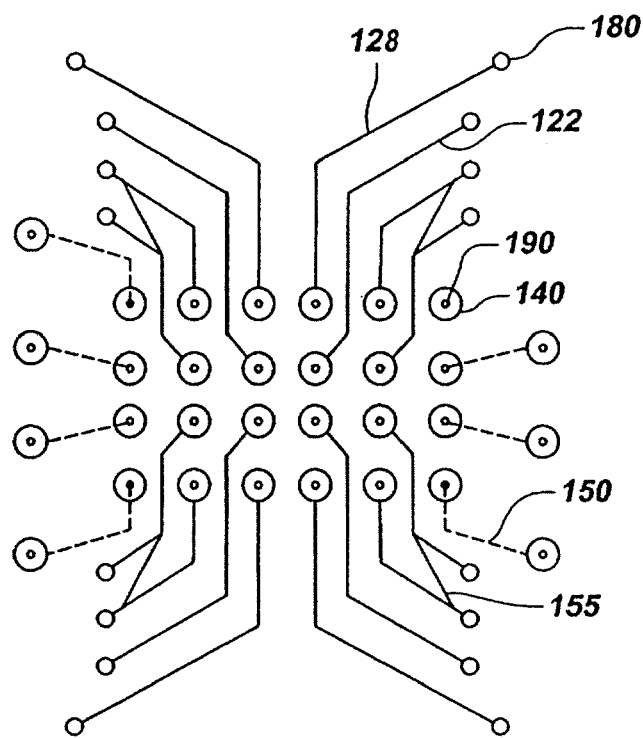
FIG. 3 shows a partial top plan view of the micro-spotting nozzle array of the micro-spotting device shown in FIGS. 1 and 4.

As shown in the array of micro-spotting nozzles in FIG. 3, each micro-spotting nozzle 140, 190 is connected to a single channel. This single channel in turn is connected to at least one reservoir feed hole (as shown by channels 128, 122), or alternatively, connected to two or more reservoir feed holes (as shown by the connection channel 155). These channels may reside horizontally in the x, y plane, as designated by the solid lines of FIG. 3, or they may entirely or have portions thereof residing vertically in the z direction, as designated by the dashed lines in FIG. 3. That is, the channels of the micro-spotting device may be at the same level within the device, or they may be at different levels within the micro device. In so doing, the channels may be punched within the same greensheet, such as channels 128 and 122, whereby such channels may be staggered and separate from one another. In this aspect, the device will have a single feed hole connected to a single channel. Alternatively, the channels 128 and 122 may be connected to one another within the same level for enabling the mixing of two or more fluids from two or more feed holes within the channels prior to dispensing.

For instance, if first and second feed holes are connected to each other via first and second channels, the point at which such channels connect is where the dispensed fluids will begin to mix. These fluids may then continue to mix until the mixture reaches the corresponding small outlet micro-spotting nozzle 190 to which such channel is connected to for dispensing the mixture in drops onto a substrate. Whether a channel is connected to numerous reservoir feed holes or a single feed hole, these channels are preferably overlapped punched within each greensheet, such that they may be formed entirely horizontal, partially horizontal and partially vertical (i.e., connections 180), or they may even be formed having vertically angled portions connected to horizontal portions within the micro-spotting device.

The single large cavity 110 of the device 100 is adapted to receive an actuating means for forcing a pressure, preferably air pressure, down into the micro-spotting nozzles 140, 190, such that, when the reservoir feed holes 120, 160 are provided with a fluid, the air pressure actuates a surface of the fluid residing in each micro-spotting nozzle, which in turn initiates the capillary action of the device for drawing fluid from the reservoirs, into and through the channels, and into the micro-spotting nozzles for simultaneously dispensing a micro array of fluid drops across the substrate surface (e.g., test slide surface). With each force of pressurized air from the large cavity 110, droplets of fluid are dispensed from the micro-spotting device 100 onto the substrate. The dispensing micro-spotting nozzle outlets 190 preferably have diameters less than about 50 microns, more preferably from about 20 microns (or even smaller) to about 50 microns, thereby enabling the dispensing or numerous drops of fluid, or mixtures or fluids, per unit surface area of the substrate.

Figure 4:
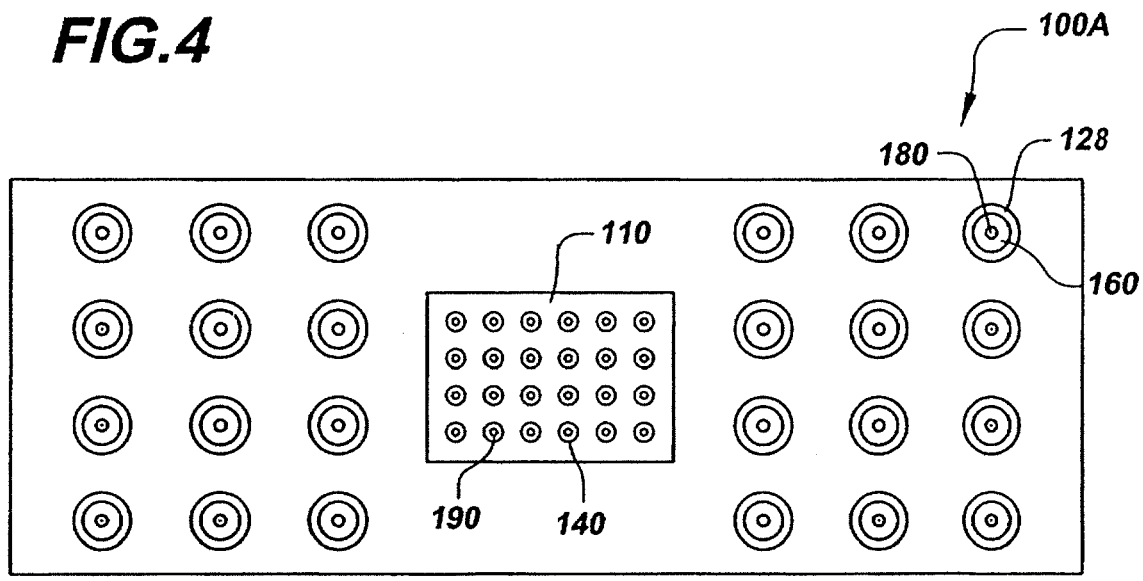
FIG. 4 shows a top plane view of a micro-spotting device of the invention having a rectangular shape.
Figure 5:
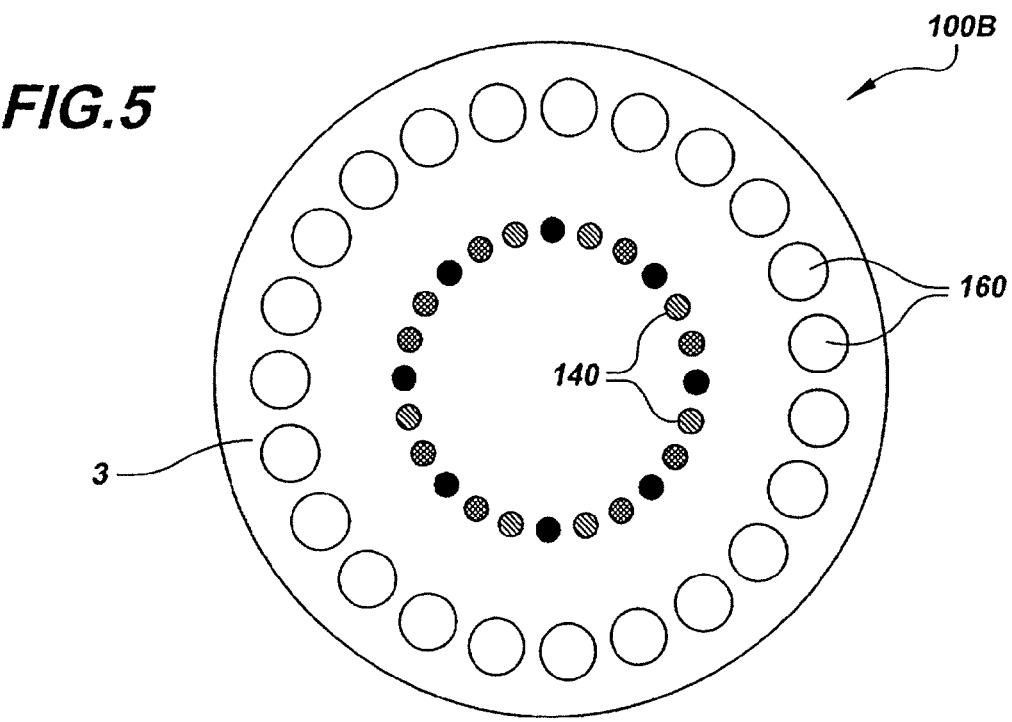
FIGS. 5 and 6 show top plan views of different layers within FIG. 2 used to form another micro-spotting device of the invention having a circular shape.
Figure 6:
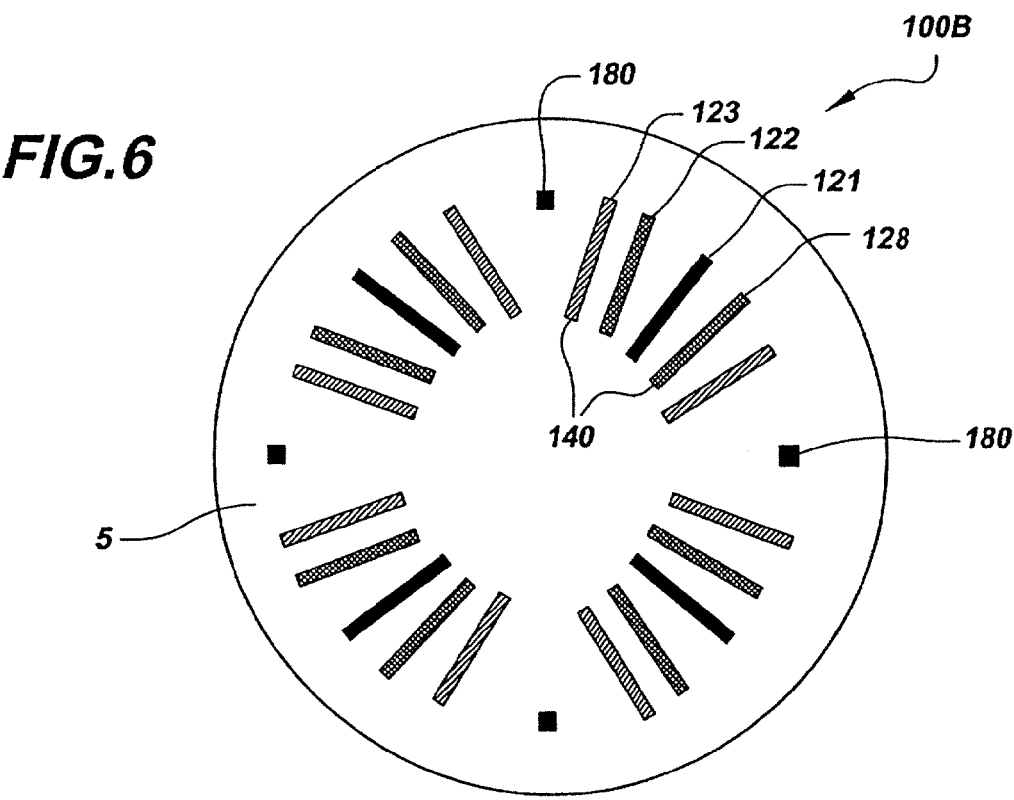

Referring to FIGS. 4-6, the micro-spotting device may be provided with any desired shape that allows for ease of integration into macro testing instrumentation, such as, circular, square, rectangular, and the like. For instance, FIG. 4 shows a top plane view of micro-spotting device 100A having a rectangular shape. This micro-spotting device 100A has the single large cavity 110 substantially at a center thereof with the micro-spotting nozzles 140, 190. This single large cavity is shown in a substantially rectangular pattern; however, it should be appreciated that the cavity may have any desired shape to meet customized specifications. On opposite sides of the cavity 110 resides a first array of feeding holes and a second array of feeding holes for receiving and retaining a fluid or fluids. Each opening, including both vertically and horizontally punched openings, may be also have a variety of shapes including, but not limited to circular, square, rectangular, etc.

FIGS. 5 and 6 show an alternative embodiment whereby a circular micro-spotting device 100B is fabricated, whereby FIG. 5 shows a top plan view of the circular device across layer 3 of the FIG. 2, while FIG. 6 shows a top plan view across layer 5 of FIG. 2. As shown in this embodiment of the invention, the micro-spotting nozzles 140, 190 (only large portion 140 is shown) reside in a circular pattern within the device. The reservoir feeding holes 120, 160 (only lower portion 160 is shown) are also provided within a circular pattern entirely surrounding the circular micro-spotting nozzles. FIG. 6 shows a number of channels 128, 121, 122, 123, etc. formed within the same x-y plane in a circular fashion. The inner most end of these channels corresponds to openings 14 for forming the micro-spotting nozzles. That is, the end of each channel closest to the center of the device within the layer is used as the opening for forming the micro-spotting nozzles. Also shown in FIG. 6 is that channels are provided at different levels within the device 1 .phi.B, whereby the connection 180 connects the reservoirs to the underlying channels (not shown).

Thus, the present invention advantageously provides micro-spotting devices that can be personalized to meet desired specifications for dispensing small amounts of fluids, or mixtures of fluids, onto a substrate, preferably a test slide that can be dried for later diagnostic and/or experimental use. Another advantage is that the micro-spotting devices are also capable of dispensing numerous drops of liquid per unit area in a controlled, consistent and repeatable manner onto the substrate. The present micro-spotting devices substantially avoid any cross-talk since the interconnection of channels are buried within the micro-spotting device body. The micro-spotting devices of the invention reduce costs, minimize the amount of reagent dispensed, increase the number of samples/reagents that can be tested in a single processing run, and are easy and efficient to use when microspotting glass slides, thereby enabling rapid, multiple sample-point testing on a single glass slide.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of dispensing fluids from a ceramic plate comprising:
    providing a ceramic body having openings with hydrophilic surfaces including a plurality of reservoir feed holes, an open cavity over and in direct communication with a plurality of dispensing nozzles, and a plurality of channels connecting said plurality of reservoir feed holes to said plurality of dispensing nozzles, at least one channel of said plurality of channels being connected to at least two feed holes of said plurality of reservoir feed holes, said ceramic body comprising a plurality of sintered layered greensheets having a number of vertical and horizontal openings that together form said plurality of channels, such that, said plurality of channels comprise a matrix of channels residing at various heights throughout and within said ceramic body;
    providing fluids into said plurality of reservoir feed holes;
    providing an actuating means within said open cavity, said actuating means sealing and generating a pressure within said open cavity;
    forcing said pressure into said plurality of dispensing nozzles using said actuating means within said open cavity;
    actuating a surface of said fluids residing in each said plurality of reservoir feed holes via said pressure so that capillary action draws said fluids from said plurality of reservoir feed holes into said plurality of channels;
    transferring said fluids from said plurality of reservoir feed holes into said plurality of channels so that said fluids from said at least two feed holes are introduced into and intimately mixed in said at least one channel between said reservoir feed holes and said dispensing nozzles during transit at a creep flow of about $Re<1$ to form a mixture;
    transferring said fluids and said mixture into said plurality of dispensing nozzles having diameters less than about 50 microns; and
    simultaneously dispensing a micro array of drops per unit surface area of said fluids and said mixture from said plurality of dispensing nozzles onto a substrate.

2. The method of claim 1, wherein said actuating means comprises a plunger within said open cavity, said plunger sealing and generating said pressure within said open cavity.

3. The method of claim 1, wherein said ceramic body has a shape selected from the group consisting of circular, square and rectangular.

4. The method of claim 1, wherein selected ones of said plurality of channels have horizontal portions in combination with vertically angled portions residing within said ceramic body.

5. The method of claim 1, wherein a single greensheet of said plurality of greensheets has both said vertical and horizontal openings that form said plurality of channels.

6. The method of claim 1, wherein two or more of said plurality of greensheets have both said vertical and horizontal openings that form said plurality of channels.

* * * * *